United States Patent
Okochi et al.

(10) Patent No.: US 8,094,975 B2
(45) Date of Patent: Jan. 10, 2012

(54) SYSTEM AND METHOD FOR FACTORY WORK LOGGING

(75) Inventors: Toshio Okochi, Musashino (JP); Kei Suzuki, Kokubunji (JP); Kazuhiko Matsumoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 614 days.

(21) Appl. No.: 12/314,844

(22) Filed: Dec. 17, 2008

(65) Prior Publication Data

US 2009/0232366 A1 Sep. 17, 2009

(30) Foreign Application Priority Data

Mar. 11, 2008 (JP) ................................ 2008-060787

(51) Int. Cl.
*G06K 9/22* (2006.01)

(52) U.S. Cl. ............... 382/313; 178/18.01; 235/472.01; 345/180; 358/473

(58) Field of Classification Search .................. 382/100, 382/103, 106, 107, 119–123, 181, 186–190, 382/199, 312–315; 178/18.01, 19.01; 235/472.01; 345/163–166, 179–183; 358/473
See application file for complete search history.

(56) References Cited

U.S. PATENT DOCUMENTS

| | | | |
|---|---|---|---|
| 6,703,570 B1 * | 3/2004 | Russell et al. ............. | 178/19.03 |
| 7,110,576 B2 * | 9/2006 | Norris et al. ................. | 382/119 |
| 7,366,579 B2 | 4/2008 | Ara et al. | |
| 7,590,311 B2 * | 9/2009 | Silverbrook et al. ......... | 382/313 |
| 7,639,876 B2 * | 12/2009 | Clary et al. ................... | 382/186 |
| 7,738,674 B2 * | 6/2010 | Silverbrook et al. ......... | 382/100 |
| 7,936,343 B2 * | 5/2011 | Lapstun et al. ............... | 345/179 |
| 2007/0102505 A1 | 5/2007 | Yokota et al. | |

FOREIGN PATENT DOCUMENTS

| | | |
|---|---|---|
| JP | 2003-529852 | 3/2001 |
| JP | 2007-108813 | 10/2005 |
| JP | 2007-151383 | 10/2006 |
| WO | WO 01/75779 A1 | 3/2001 |

* cited by examiner

*Primary Examiner* — Anand Bhatnagar
(74) *Attorney, Agent, or Firm* — Stites & Harbison, PLLC; Juan Carlos A. Marquez, Esq.

(57) ABSTRACT

Provided is an information processing system which has a plurality of tags, a tag reader, a digital-pen, and a server. The plurality of tags each hold a tag identifier. The tag reader reads the tag identifier held in each of the plurality of tags. The digital-pen reads location information, which identifies a location where handwriting is made on paper. The server keeps work record including information that associates the tag identifier recorded in the server in advance with the location on paper. When it is judged that the read tag identifier and a handwriting location identified by the location information are associated with each other, the server judges whether or not the read tag identifier matches the tag identifier recorded in advance that is associated by the work record with the handwriting location identified by the location information. The server outputs a result of the judging.

12 Claims, 7 Drawing Sheets

| ITEM | CHECK | CABLE ID | SOCKET ID |
|---|---|---|---|
| 386 | ✓ | AB:CD:EF:01 | 23:45:67:89 |
| | | | |
| | | | |
| | | | |
| | | | |

| ITEM | SITE | CABLE ID | SOCKET ID | TAG ID 1 | TAG ID 2 | READER ID | STATUS OF WORK | TIME OF HANDWRITING | PEN ID | RESULT OF VERIFICATION |
|---|---|---|---|---|---|---|---|---|---|---|
| 386 | 2 | AB:CD:EF:01 | 23:45:67:89 | AB:CD:EF:01 | 23:45:67:89 | 00:11:22 | COMPLETED | 9/20 13:30 | AA:BB:CC | NG |
| 387 | 3 | AB:CD:EF:02 | 23:45:67:8A | AB:CD:EF:02 | 23:45:67:8A | 00:11:22 | COMPLETED | 9/20 13:38 | AA:BB:CC | OK |
| 388 | 3 | AB:CD:EF:03 | 23:45:67:8B | AB:CD:EF:03 | 23:45:67:8B | | NOT COMPLETED | | | |
| | | | | | | | | | | |

FIG. 6

SYSTEM AND METHOD FOR FACTORY WORK LOGGING

CLAIM OF PRIORITY

The present application claims priority from Japanese application JP2008-060787 filed on Mar. 11, 2008, the content of which is hereby incorporated by reference into this application.

BACKGROUND OF THE INVENTION

This invention relates to a handwritten information processing system and a handwritten information processing method with which a pattern written by hand onto a paper document is reflected on an electronic document. More particularly, a technology disclosed herein relates to an information processing system which uses a handwritten information processing system and an RFID (Radio Frequency Identification) in combination to create and maintain a work log.

For processes of plant construction, railroad car manufacture, and the like, improving the efficiency of cable wiring work and reducing mistakes in work operations are issues to be tackled. The reliability of those spot works has conventionally been secured by keeping a work log with the use of a work instruction sheet or a checklist. Also, methods have been developed in JP 2003-529852 A to digitize such handwritten information quickly by means of a digital-pen or other similar tools.

JP 2007-151383 A, for example, discloses a measure to improve the work efficiency and reliability. According to JP 2007-151383 A, an RFID is attached to a cable and a wiring board each. A worker carries a portable terminal which can refer to design information and an RFID reader, and checks the association relation between the cable and the wiring board during wire connection work by reading the RFID of the cable and the RFID of the wiring board both. There has also been proposed a work guiding method in which LEDs are fit into sockets on a wiring board and, when a worker reads the RFID of a cable, a socket to which the cable is to be plugged is retrieved from design information and the socket's LED emits light.

JP 2007-108813 A describes a method of analyzing the work status from information about the location and behavior of a worker which is obtained via a name tag having a wireless communication function.

SUMMARY OF THE INVENTION

In the conventional logging method using a paper checklist where a worker writes in the checklist by hand, it is practically impossible to eliminate miswriting completely and the accuracy of records is not satisfactory. Other problems of the logging method using a paper checklist stem from recording information on paper, including difficulties in sharing information and vulnerability to falsification. Systems using a digital-pen, too, are having only a limited success in securing the reliability of information, for the act of writing itself carried out by hand.

The above-mentioned method developed to improve the work efficiency requires a work site to have sophisticated information technology equipments, including a portable terminal which enables a worker to refer to design information and a control system for controlling LEDs attached to the wiring board from the worker's portable terminal or from a server. Using those many information processing equipments on a work site increases the maintenance cost and provokes more frequent work delays caused by failures in the information processing equipments, with the result that the work efficiency is not improved much.

Further, in manual work with diverse features such as construction work, it is sometimes impossible or inappropriate to strictly follow the specifications of the blueprint, depending on how things are going on the work site. In such cases, changing details such as employing a more appropriate work method may be decided on site. The above-mentioned method which guides work according to design information is often inadequate for those applications.

It is therefore an object of this invention to provide a means to solve the above-mentioned problems through an accurate record of work operations which is obtained without using many sophisticated information processing equipments on a work site and without increasing the burden on workers.

According to a representative invention disclosed in this application, there is provided an information processing system, comprising: a plurality of tags; a tag reader; a digital-pen; and a server, wherein the plurality of tags each hold a unique tag identifier, wherein the tag reader reads the unique tag identifier held in each of the plurality of tags, and outputs the read unique tag identifier, wherein the digital-pen reads location information, which identifies a location where handwriting is made on paper, and outputs the read location information, and wherein the server is configured to: hold work record including information that associates the unique tag identifier recorded in the server in advance with the location on paper; obtain information output from the tag reader and information output from the digital-pen; judge whether or not the read unique tag identifier and a handwriting location identified by the location information are associated with each other; identify which unique tag identifier recorded in advance is associated by the work record with the handwriting location identified by the location information, and judge whether or not the read unique tag identifier and the identified unique tag identifier match in a case where the read unique tag identifier and the handwriting location identified by the location information are judged to be associated with each other; and output information showing a result of judging whether or not the read unique tag identifier and the identified unique tag identifier match.

According to an embodiment of this invention, the reliability of handwritten work log information can be improved. This invention also makes it easy to find mistakes in work operations and miswriting.

BRIEF DESCRIPTION OF THE DRAWINGS

FIG. 6 is an explanatory diagram illustrating another example of the work log information according to the embodiment of this invention.

DETAILED DESCRIPTION OF THE PREFERRED EMBODIMENT

Figure 1:
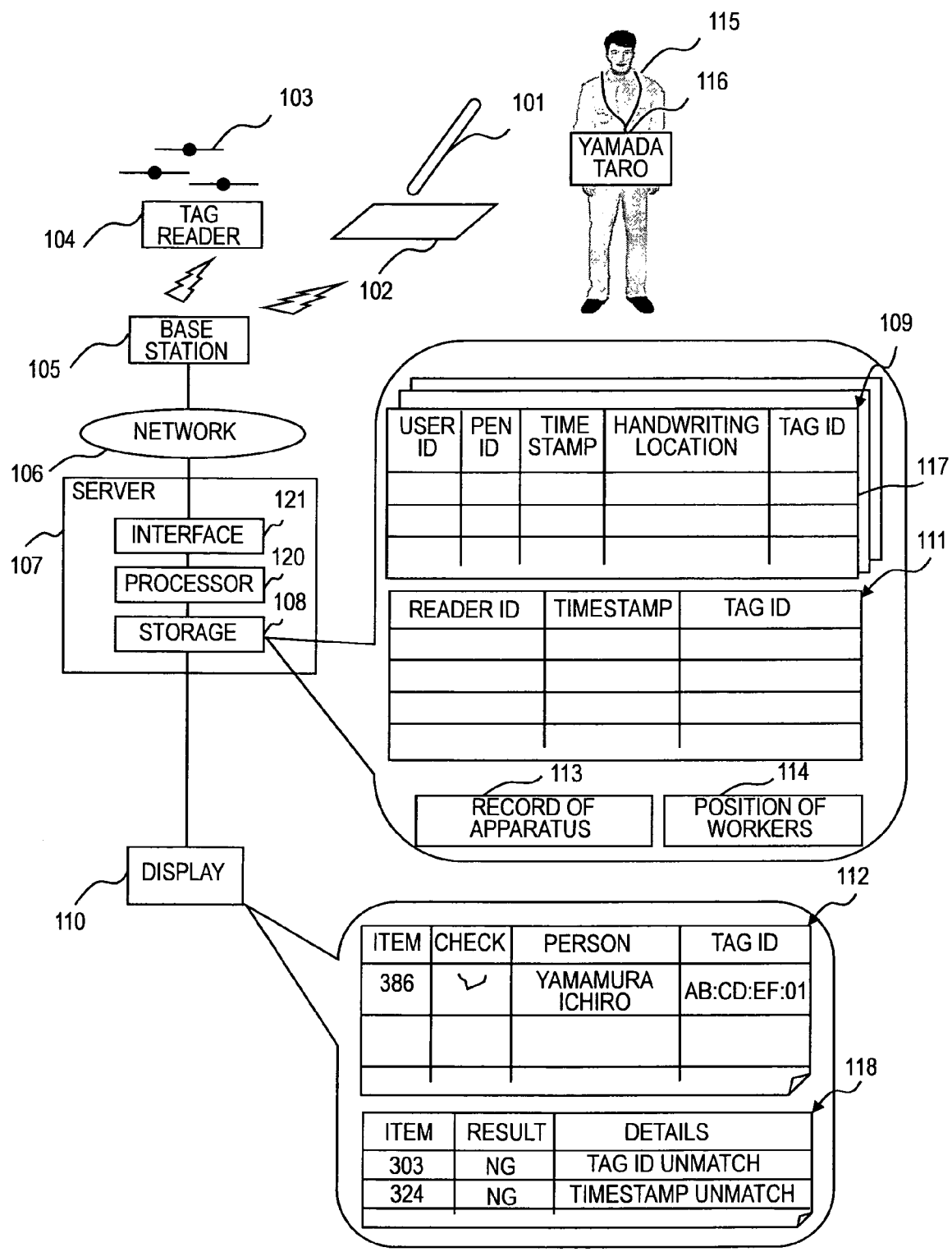
FIG. 1 is an explanatory diagram illustrating the configuration of a factory work logging system according to an embodiment of this invention.

FIG. 1 is an explanatory diagram illustrating the configuration of a factory work logging system according to an embodiment of this invention.

The factory work logging system of this embodiment includes a digital-pen 101, at least one work checklist 102, at least one electronic tag 103, and a tag reader 104. The digital-pen 101 and the tag reader 104 communicate wirelessly with a base station 105. The base station 105 is coupled to a server 107 via a network 106.

The server 107 is a computer that includes storage 108, a processor 120, and an interface 121.

The interface 121 is coupled to the network 106 to communicate with the base station 105 over the network 106, thus enabling the server 107 to receive information sent from the digital-pen 101 and the tag reader 104 through the base station 105 and the network 106.

The processor 120 is coupled to the interface 121 and the storage 108, and controls the server 107 by running a program (not shown) stored in the storage 108. In the following description, processing by the server 107 is executed by the processor 120 by running the program.

The storage 108 can be of any type. For example, the storage 108 may be a semiconductor memory such as a DRAM or a flash memory, may be a hard disk drive, or may be a combination of the former and the latter. The storage 108 stores a program executed by the processor 120 and various kinds of data.

Specifically, the storage 108 holds for each work checklist 102 electric data 109 of checklist, which contains data to be printed on the work checklist 102 and information about handwriting written with the digital-pen 101. The storage 108 further holds a tag readings information table 111 in which information including a tag ID (identifier of each electronic tag 103) read by the tag reader 104 is recorded. The tag readings information table 111 also holds information such as a reader ID (unique identifier of tag reader 104) and a timestamp in addition to the tag ID. The tag ID can be recorded in association with the handwriting information in the above-mentioned electric data 109 of checklist.

The work checklist 102 has a unique identification pattern which is used by a digital-pen system to identify one work checklist from another and to uniquely identify the location (coordinates) of handwriting written on the work checklist 102. In other words, the identification pattern contains information for identifying a work checklist on which the pattern is printed, and information for identifying a point (coordinates) on the work checklist on which the pattern is printed. For example, the identification pattern is printed in advance on a sheet of paper on which the work checklist 102 is printed. The identification pattern information on every work checklist 102 is managed by the server 107.

The digital-pen 101 has an image capturing function. With the image capturing function, the digital-pen 101 reads the identification pattern on the work checklist 102 to transfer to the server 107 handwriting written by a worker on the work checklist 102 and the read identification pattern. The server 107 identifies the work checklist 102 that is associated with the identification pattern sent from the digital-pen 101, and records the handwriting information in the electric data 109 of checklist that is associated with the identified work checklist 102. A digital-pen system as this is implemented by, for example, the method disclosed in JP 2003-529852 A.

The storage 108 of the server 107 further stores a record of apparatus 113, which contains a record of lending apparatuses such as the tag reader 104 and the digital-pen 101, and a record of position of workers 114, which indicates the location of a worker at a particular time.

The server 107 is coupled to a display 110 directly or via a network. The display 110 is operated by a user to display a screen 112 of checklist display which contains the electric data 109 of checklist that is associated with a specific work checklist 102. The screen 112 of checklist display is, for example, displayed in the same format as the work checklist 102 printed on paper.

A worker 115 carries a name tag 116. The name tag 116 holds a unique identification number and has a wireless communication function to communicate at least the unique identification number to the base station 105.

The display 110 further displays a screen 118 of diagnosis display when a verification of a work log finds a work operation diagnosed as a mistake or a work method diagnosed as inappropriate. The screen 118 of diagnosis display contains the item number of the work operation in question, the diagnosis result, and the basis of the diagnosis.

The electronic tag 103 is a device called a radio frequency identification device (RFID) that holds wireless communication with the tag reader 104 using electromagnetic waves. The electronic tag 103 includes an integrated circuit and an antenna. The integrated circuit contains a memory in which an identifier (ID) unique to the electronic tag 103 is recorded. The electronic tag 103 receives and demodulates electromagnetic waves sent from the tag reader 104, thereby interpreting a control command sent from the tag reader 104. Of the electromagnetic waves sent from the tag reader 104, the electronic tag 103 backscatters carrier waves in a manner that is varied depending on the unique ID recorded in the memory. The tag reader 104 receives and modulates the backscattered waves, thereby reading the unique ID of this electronic tag. The electronic tag 103 operates on a power source that is created in a rectifier circuit within the electronic tag 103 from electromagnetic waves transmitted by the tag reader 104.

Figure 2:
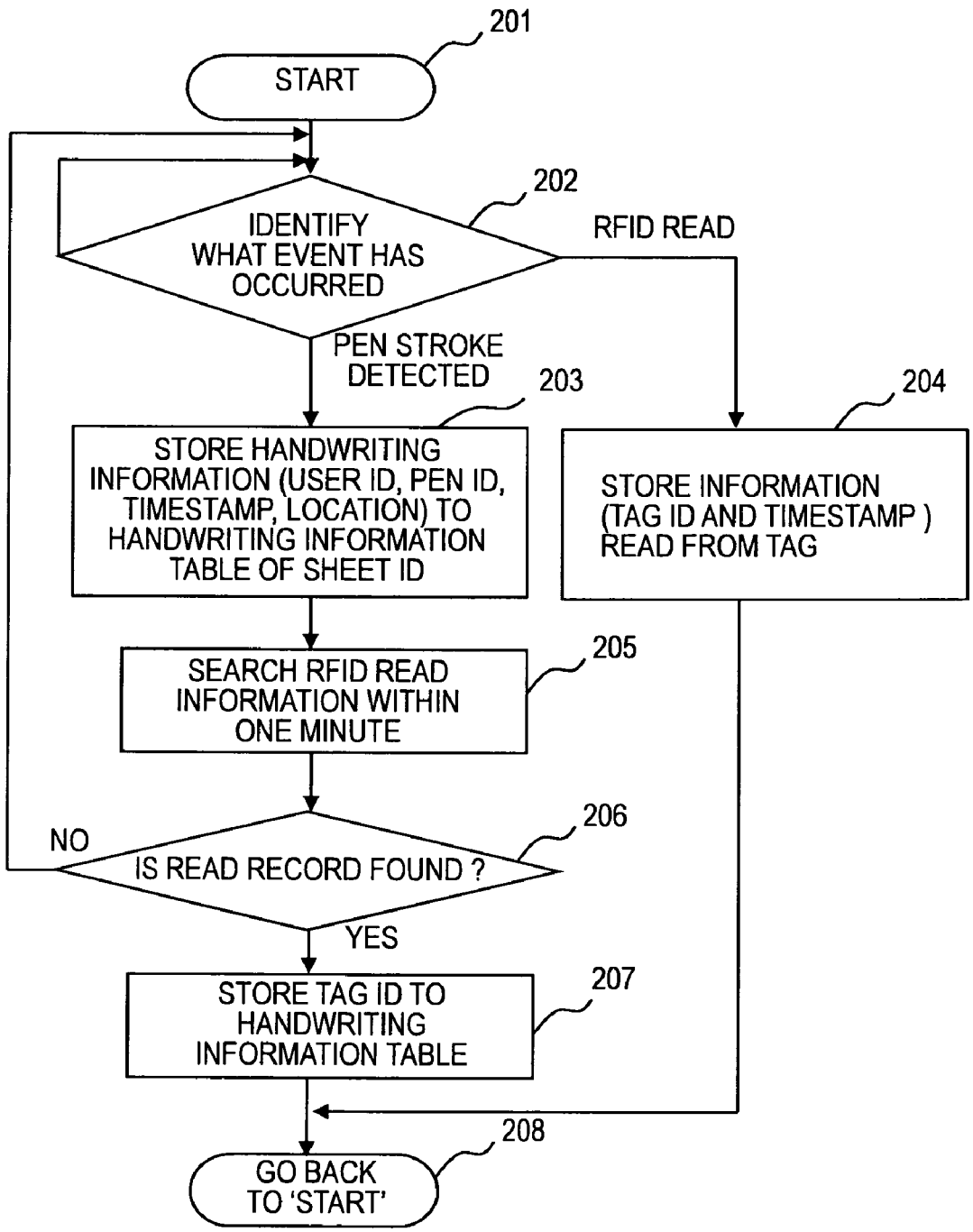
FIG. 2 is a flow chart illustrating steps of processing executed in the embodiment of this invention.

FIG. 2 is a flow chart illustrating steps of processing executed in the embodiment of this invention.

Specifically, FIG. 2 illustrates processing steps executed by the server 107 in the system of FIG. 1 in order to record handwriting information and the ID of the electronic tag 103 in association with each other.

When the worker 115 writes on the work checklist 102 with the digital-pen 101, a scanner 302 at the tip of the digital-pen 101 reads, at least, the handwriting, the position of the handwriting on the work checklist 102, and the unique ID of the work checklist 102 on which the worker 115 has written (i.e., checklist ID). The digital-pen 101 sends the read information along with a timestamp and a pen ID to the server 107 via the base station 105. The timestamp here indicates a time at which the worker 115 has written on the work checklist 102, and the pen ID is an ID unique to the digital-pen 101.

The tag reader 104 reads the electronic tag 103, and then sends the read tag ID along with a timestamp and its reader ID to the server 107 via the base station 105. The timestamp here indicates a time at which the tag reader 104 has read the electronic tag 103. The transmission of the above-mentioned information from the digital-pen 101 and from the tag reader 104 may be executed whenever the digital-pen 101 or the tag reader 104 detects an event such as writing on the work checklist 102 in the case of the digital-pen 101 or reading of the electronic tag 103 in the case of the tag reader 104, or may be executed on a given schedule (periodically, for example).

When the processing of FIG. 2 is started (201), the server 107 monitors at regular intervals for messages from the digital-pen 101 and from the tag reader 104. Upon reception of a message, the server 107 identifies what event has occurred (202).

In the case where the received message contains handwriting information provided by the digital-pen 101, "pen stroke" (writing on work checklist 102 by worker 115) is identified as the event. The server 107 in this case records the handwriting information in the electric data 109 of checklist that is associated with a checklist ID contained in the received message (203). The handwriting information contains a user ID, a pen ID, a timestamp, coordinates, and the like.

In the case where the received message contains tag readings information provided by the tag reader 104, "RFID read" (reading of electronic tag 103 by tag reader 104) is identified as the event. The server 107 in this case records the received tag ID and timestamp in the tag readings information table 111 (204).

After Step 203 is executed, the server 107 associates the recorded handwriting information with a tag ID recorded in the tag readings information table 111.

For example, the handwriting information may be associated with a tag ID when a time at which the handwriting information is obtained by the digital-pen 101 and a time at which the tag ID is read by the tag reader 104 meet a given condition. This is accomplished as follows:

First, the server 107 searches the tag readings information table 111 for tag readings information read within one minute prior to the timestamp of the handwriting information (205). More specifically, the server 107 checks whether or not any timestamp recorded in the tag- readings information table 111 is of a time between one minute prior to a time that is indicated by the timestamp of the handwriting information recorded in Step 203 and the indicated time. When such timestamp is found, the server 107 retrieves tag readings information that contains this timestamp as a search result.

Next, the server 107 judges whether or not any tag readings information has been retrieved as a search result of Step 205 (in other words, whether or not tag readings information that meets the above-mentioned search criterion has been recorded) (206). In the case where no tag readings information meets the search criterion, the processing returns to Step 202. In the case where tag readings information that meets the search criterion is found, the server 107 determines that this tag readings information is associated with the handwriting information recorded in Step 203, and records a tag ID contained in this tag readings information as a tag ID of a handwriting information record 117 in the electric data 109 of checklist (207). The handwriting information record 117 corresponds to the handwriting information recorded in Step 203.

After Step 204 is finished, and after Step 207 is finished, the processing returns to Step 202 (208).

As a method for associating handwriting information with a tag ID contained in tag readings information, a criterion suited to the specifics of each work operation is determined.

For example, in the case of a work operation for plugging a cable (not shown) into a socket (not shown) in a wiring board (not shown), the worker 115 reads the electronic tag 103 attached to the target socket and the electronic tag 103 attached to the target cable by using the tag reader 104. The worker 115 thereafter plugs the cable into the socket. The worker 115 next writes a character, a check mark, or the like that indicates the completion of the plugging work in the work checklist 102 with the digital-pen 101.

It is logical to presume that this series of steps from reading the electronic tags 103 to writing on the work checklist 102 is finished, if executed normally, within a given length of time (for example, about one minute). Accordingly, in the case where handwriting information contains a timestamp that indicates a time within a given time period since the time at which the tag IDs of the electronic tags 103 attached to one cable and to one socket are read, this handwriting information can be associated with tag readings information of these electronic tags 103 as one indicating the completion of a work operation performed on the cable and the socket.

This is why tag readings information that has been read within a given length of time (one minute in example of FIG. 2) prior to a timestamp of handwriting information can be associated with this handwriting information as has been described with reference to FIG. 2.

Alternatively, considering that keeping to the above-mentioned order of work steps means that the next work operation is not executed after a certain work operation is finished until a result of the preceding work operation is written in the work checklist 102, tag readings information containing, for example, a timestamp that is earlier than a timestamp of handwriting information and that is closest to the timestamp of the handwriting information may be associated with this handwriting information.

Still another option is to let the worker 115 associate the tag IDs of objects to be worked on with handwriting information intentionally as will be described later with reference to FIG. 3.

Figures 3, 4:
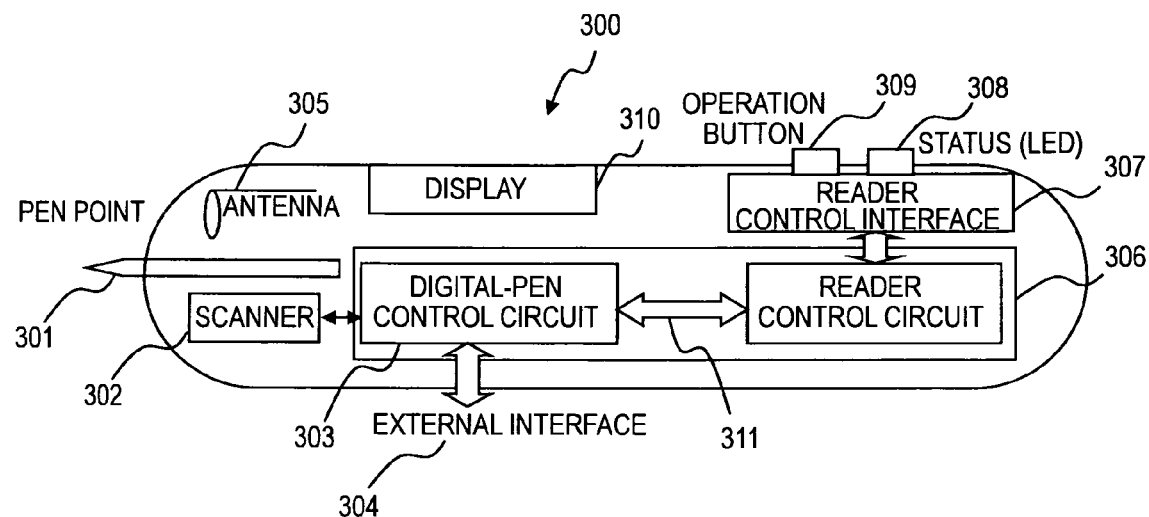
FIG. 3 is an explanatory diagram illustrating the configuration of a digital-pen which is used in the embodiment of this invention.
FIG. 4 is an explanatory diagram of a work checklist used in the embodiment of this invention.

FIG. 3 is an explanatory diagram illustrating the configuration of a digital-pen 300 which is used in the embodiment of this invention.

The digital-pen 300 illustrated in FIG. 3 has the functions of the tag reader 104 in addition to the functions of the digital-pen 101 illustrated in FIG. 1 in order to make it simpler for workers to operate and to make work logging more accurate.

The digital-pen 300 includes a digital-pen function module, which corresponds to the digital-pen 101 of FIG. 1, and a tag reader function module, which corresponds to the tag reader 104 of FIG. 1. The digital-pen function module includes a pen point 301, the scanner 302, a digital-pen control circuit 303, and an external interface 304. The tag reader function module includes an antenna 305, a reader control circuit 306, a reader control interface 307, a status LED 308, an operation button 309, and a display 310. The reader control circuit 306 and the digital-pen control circuit 303 are coupled by a control signal 311.

The following description will be about a system configuration, work method, and processing method for logging cable coupling work with the use of the digital-pen 300 having tag reader functions.

The worker 115 checks the IDs of a pair consisting of a cable and a socket to be coupled on a work instruction sheet, and looks for a cable terminal and a socket that are identified by these IDs. For this work, visually identifiable tags may be attached to cables and sockets in advance.

The worker 115 next uses the tag reader installed in the digital-pen 300 to read the electronic tag 103 of the cable terminal and the electronic tag 103 attached to the socket. The tag IDs of the read electronic tags 103 may be displayed on the display 310. The worker 115 can check the tag IDs by consulting the display 310. The digital-pen 300 lights the status LED 308 when a tag ID is read.

The worker 115 then writes with the digital-pen 300 on a region of the work checklist 102 that is, for example, assigned to the cable to be coupled to indicate the completion of the wire connection work. When the writing is finished, the status LED 308 is turned off. The digital-pen 300 stores handwriting information of what has been written and tag IDs that have been displayed on the display 310 at the time of the writing in association with each other. Through these or similar steps, the worker 115 can enter information that intentionally associates a read tag ID and handwriting information of handwriting written on the work checklist 102 with each other.

When the worker 115 writes on the work checklist 102, the digital-pen 300 sends the handwriting information as well as the already read cable terminal tag ID and socket tag ID to the server 107 via the external interface 304. In the case where the worker 115 intentionally associates handwriting information and a tag ID as described above, information associating the handwriting information and the tag ID is also sent to the server 107.

The external interface 304 may be an interface that has a wireless communication function or a contact type interface. In the case of a contact type interface, for example, information is accumulated within the digital-pen 300 for the duration of a work operation and, after the work operation is finished, the accumulated information is sent to the server 107 by inserting the digital-pen 300 in a cradle. The worker 115 can thus intentionally associates handwriting information and a tag ID with each other.

Further, if the digital-pen 300 is further provided with a measure that enables the worker 115 to delete tag IDs read by the tag reader and accumulated within the digital-pen 300, the worker 115 can intentionally control writing on the work checklist 102 and association with a tag ID.

FIG. 4 is an explanatory diagram of the work checklist 102 used in the embodiment of this invention.

Specifically, FIG. 4 illustrates as an example a format of the work checklist 102 in a work logging system for cable coupling work. Each item 401 (work item) is associated with a work operation for coupling a single cable. The tag IDs of a cable and a socket to be coupled by a work operation in question are written as a cable ID 403 and a socket ID 404, respectively.

The worker 115 writes with the digital-pen 300 on the paper work checklist 102 to indicate the completion of the work operation, which is followed by recording of information in the electric data 109 of checklist that is kept in the server 107 in association with this work checklist 102. The recorded information contains handwriting 402 that indicates the confirmation of the completion and the cable ID 403 and the socket ID 404 that have been read into the digital-pen 300 via the tag reader at the time of the writing.

The server 107 holds information that associates each item 401 with a point on the work checklist 102 at which its associated handwriting 402 is to be written. This information may be recorded, for example, in the storage 108 as part of the electric data 109 of checklist. When receiving handwriting information from the digital-pen 101 (or 300), the server 107 refers to the location of handwriting contained in the received handwriting information and the above-mentioned information to determine for which item 401 the handwriting has been written.

A time at which the handwriting has been generated (time at which writing indicating completion has been written) and a time at which the tags have been read may be recorded along with the handwriting 402, the cable ID 403, and the socket ID 404. By referring to these records, whether or not a work operation has been conducted properly can be verified posteriorly.

A work verification method employed by the system of this embodiment will be described next.

Figure 5:
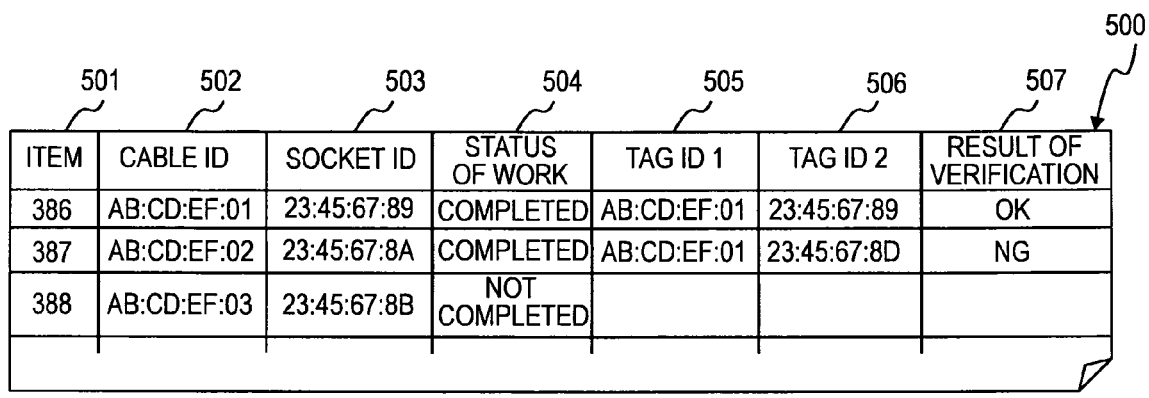
FIG. 5 is an explanatory diagram illustrating the format of work log information which is kept in a server in order to verify a work result according to the embodiment of this invention.

FIG. 5 is an explanatory diagram illustrating the format of work log information 500 which is kept in the server 107 in order to verify a work result according to the embodiment of this invention.

The work log information 500 includes, for each work item, fields for an item number 501, a cable ID 502, a socket ID 503, a status of work 504, a tag identification number (tag ID-1) 505, a tag identification number (tag ID-2) 506, and a result of verification 507. The work log information 500 is kept in the storage 108 of the server 107.

The item number 501, the cable ID 502, and the socket ID 503 indicate the association between a cable and a socket to be coupled. Information in these fields is created based on design information and recorded in the respective fields before the work operation is started.

The server 107 receives the location of handwriting and identifies a work item associated with the handwriting from the received handwriting location as has been described with reference to FIG. 4. The server 107 then refers to the item number 501 of the identified work item, the cable ID 502, and the socket ID 503 to identify a cable and socket that are associated with the identified work item. The server 107 thus holds information that associates a handwriting location and the identifier of a target of a work operation (cable or the like) in advance based on design information.

After the worker 115 reads the electronic tags 103 of a cable and a socket on the work site, performs wire connection work, and writes in a given field in the work checklist 102 to indicate the completion of the work operation, the server 107 updates the status of work 504 from "uncompleted" to "completed", and records tag IDs read out of the electronic tags 103 of the cable and the socket as the tag IDs 505 and 506. The server 107 compares these two identification numbers against the cable ID and socket ID recorded in advance and, when the former and the latter do not match, causes the relevant cell for the field for the result of verification 507 to indicate an error (for example, by setting "NG"). The server 107 may display information in the field for the result of verification 507 on the display 110.

Another method of verifying a work result will be described below. A time at which handwriting has been written and a time at which the identification numbers of two electronic tags 103 have been read are recorded in the work log information 500 in addition to the above-mentioned status of work 504 and identification numbers 505 and 506 of the two electronic tags 103. The server 107 inspects the order of the writing time and the tag reading time and the interval between the former time and the latter time. When the order and interval of the writing time and the tag reading time are found to be in other relations than predetermined ones, the server 107 causes the relevant cell for the field for result of verification 507 to indicate that there has been a mistake, or that a mistake is suspected.

For example, consider a case in which, as an order of work steps, the worker 115 is supposed to perform a connection work after reading the tags of a cable and a socket, and to subsequently make a log entry to the work checklist 102. If a work order that is indicated by information sent to the server 107 differs from the order of work steps determined as above, the server 107 makes a verification indicating a suspicion that the work has not been carried out properly. The server 107 makes a verification indicating a suspicion that the work has not been carried out properly also when steps from reading the tag IDs of the cable and the socket to making a log entry to the checklist take longer than a given length of time.

A mode of carrying out this invention is described next in which, in addition to the above-mentioned items of the work log information 500, the identification number of the worker 115, the association between the worker 115 and a writing tool (digital-pen 101), and the association between the worker 115 and the tag reader 104 are managed as the work log information 500. The writing tool and the tag reader 104 may be replaced with the digital-pen 300, which has functions equivalent to those of the digital-pen 101 and functions equivalent to those of the tag reader 104.

The worker 115 carries the name tag 116 holding a unique identification number as illustrated in, for example, FIG. 1. The name tag 116 holds wireless communication with the base station 105 using electromagnetic waves. Name tags having a communication function as this are disclosed in, for example, JP 2007-108813 A cited as a related art of this invention.

The name tag 116 carried by the worker 115 is not particularly limited to the one described above. For example, the name tag 116 may be a tag that optically reads barcodes, QR (quick response) codes, or other similar codes, or may be an RFID tag from which an identification number is read by a reader with the use of electromagnetic waves. The name tag 116 may be shaped like a bracelet to be worn next to the body of the worker 115, or may be attached to the worker's clothe, shoes, cap, helmet, or the like.

The worker 115 can be associated with a writing tool and the tag reader 104 by, for example, an apparatus management system that uses ID tags. In the apparatus management system, ID tags are attached to apparatuses used on a work site. At the start of a work operation, the worker 115 registers his/her ID tag and the ID tag of an apparatus that he/she is going to use. Information indicating which apparatus has actually been used by whom at a particular time can thus be recorded. This or similar information indicating an apparatus that has actually been used by the worker 115 is recorded in the storage 108 as, for example, the record of apparatus 113 illustrated in FIG. 7.

Alternatively, the worker 115 may be associated with the tag reader 104 by using as the name tag 116 which is carried by the worker 115 the electronic tag 103 of the same type as those attached to cables and sockets, and by reading this electronic tag 103 with the tag reader 104. This method uses only one type of tag reader 104 to read the electronic tags 103 of the name tag 116, cables and the like, and therefore requires fewer types and numbers of apparatuses used on a work site.

The location of the worker 115 can be detected by, for example, employing a wireless communication terminal with a positioning function as the name tag 116 carried by the worker 115. Alternatively, an RFID may be employed as the name tag 116 carried by the worker 115. In this case, a work site is divided into a plurality of work areas, the tag reader 104 is placed in each work area, and the worker 115 makes the tag reader 104 of his/her assigned work area read the RFID that he/she carries at the start of a work operation. Information indicating the actual location of the worker 115 that is detected in this manner is recorded in the storage 108 as, for example, the record of position of workers 114 illustrated in FIG. 8.

The above-mentioned identification number and location information of the worker 115 can be used to verify the appropriateness of a work operation conducted and the correctness of a work log. A method of verifying whether or not a work operation has been conducted properly will be described below with reference to FIGS. 6, 7, and 8.

FIG. 6 is an explanatory diagram illustrating another example of the work log information according to the embodiment of this invention.

Specifically, FIG. 6 illustrates the data format of work log information 600 in which the identification numbers of a tag reader and writing tool used by the worker 115 and the location of the worker 115 are recorded.

The work log information 600 illustrated in FIG. 6 includes fields for an item 601 (work item), a site 602, a cable ID 610, a socket ID 611, tag identification information (tag ID-1) 603, tag identification information (tag ID-2) 604, a reader ID 605, a status of work 606, a time of handwriting 607, a pen ID 608, and a result of verification 609.

Of the above-mentioned fields, the fields for the item 601, the cable ID 610, the socket ID 611, the two tag IDs 603 and 604, the status of work 606, and the result of verification 609 are similar to the fields for the item 501, the cable ID 502, the socket ID 503, the two tag IDs 505 and 506, the status of work 504, and the result of verification 507, respectively. Descriptions on these fields are therefore omitted here.

Information for identifying a place in which a work operation identified by the item 601 is to be conducted is recorded as the site 602. This information is determined based on design information, a work plan, or the like and recorded in the work log information 600 before the actual work is started.

Information for identifying the tag reader 104 that has read tag IDs recorded as the tag IDs 603 and 604 is recorded as the reader ID 605.

A time at which a check mark or the like that indicates the completion of the work operation has been written in the work checklist 102 is recorded as the time of handwriting 607.

Information for identifying a writing tool (for example, digital-pen 101 or 300) that has been used to write a check mark or the like that indicates the completion of the work operation is recorded as the pen ID 608. When the employed writing tool is the digital-pen 300, the same information that is recorded as the reader ID 605 may be recorded as the pen ID 608.

Figure 7:
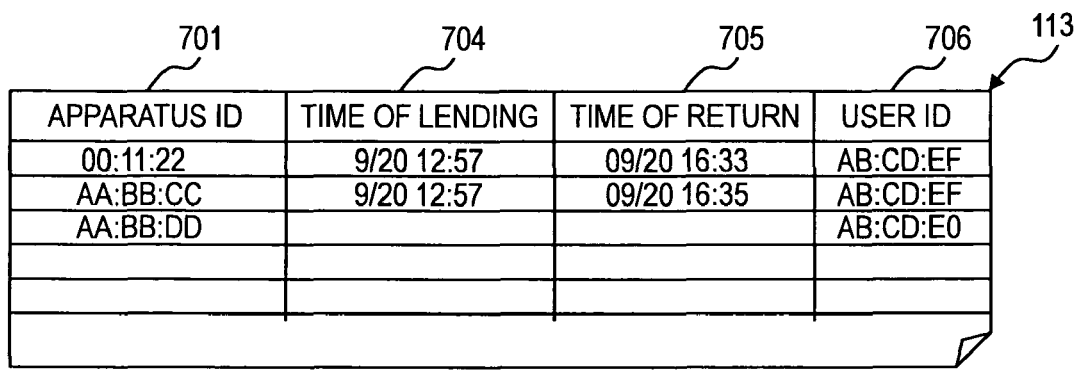
FIG. 7 is an explanatory diagram illustrating the data format of a record of apparatus which is a record of apparatus lending according to the embodiment of this invention.

FIG. 7 is an explanatory diagram illustrating the data format of the record of apparatus 113 which is a record of apparatus lending according to the embodiment of this invention.

The record of apparatus 113 illustrated in FIG. 7 includes fields for an apparatus ID 701, a time of lending 704, a time of return 705, and a user ID 706.

Information for identifying an apparatus used by the worker 115, for example, a writing tool and the tag reader 104 is recorded as the apparatus ID 701.

A time at which an apparatus has been lent to the worker 115 and a time at which the apparatus has been returned are recorded as the time of lending 704 and the time of return 705, respectively.

As an Information for identifying the worker 115 that has used an apparatus (worker 115 to which apparatus has been lent), for example, ID information that has been read from the name tag 116 carried by the worker 115 is recorded as the user ID 706.

Figure 8:
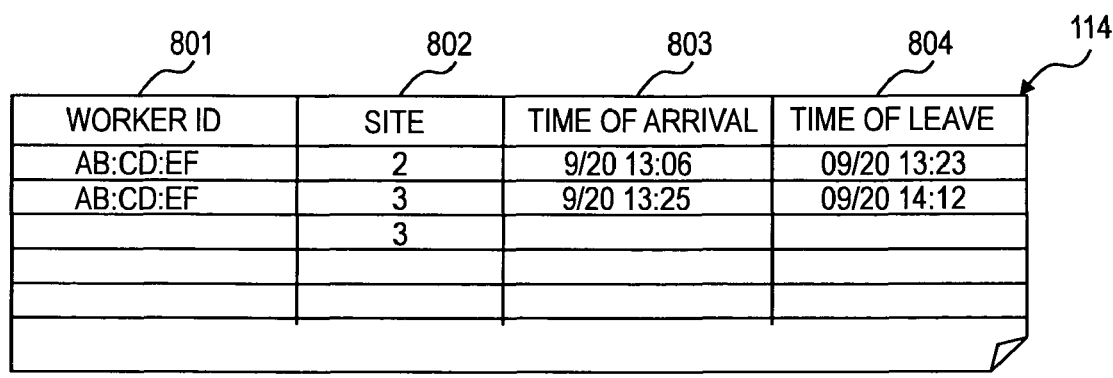
FIG. 8 is an explanatory diagram illustrating the data format of a record of position of workers in which where a worker has stayed is recorded according to the embodiment of this invention.

FIG. 8 is an explanatory diagram illustrating the data format of the record of position of workers 114 in which where the worker 115 has stayed is recorded according to the embodiment of this invention.

The record of position of workers 114 illustrated in FIG. 8 includes fields for a worker ID 801, a site 802, a time of arrival 803, and a time of leave 804.

Information for identifying the worker 115 is recorded as the worker ID 801.

Information for identifying a place in which the worker 115 has stayed and actually conducted a work operation is recorded as the site 802.

A time at which the worker 115 has arrived at a place where he/she has conducted the work operation and a time at which the worker 115 has left the place are recorded as the time of arrival 803 and the time of leave 804, respectively.

For example, it can be read from the first and second rows in the work log information 600 of FIG. 6 that one worker 115 has used the tag reader 104 having an apparatus ID "00:11:22" and a writing tool having a pen ID "AA:BB:CC", has carried out a work operation specified by an item number "386" on a site "2", has carried out a work operation specified by an item number "387" on a site "3", and has written in the checklist to indicate the completion of these work operations.

An additional fact can be read from the record of apparatus 113 of FIG. 7 which indicates that, in a period of time when the above-mentioned work operations have been conducted, the tag reader 104 used for the above-mentioned work operations and the writing tool used to make the above-mentioned log entry have been lent to the worker 115 having a worker ID "AB:CD:EF".

A reference to FIG. 8 indicates that the worker 115 having the worker ID "AB:CD:EF" has been on the site "3" instead of the site "2" at the time when the completion of the work operation indicated by the item 386 has been written in the checklist (September 20, 13:30). It is surmised from these findings that the worker 115 has not written in the checklist upon completion of a work operation in a place where he/she has conducted the work operation. In such cases, the server 107 records information indicating a suspicion that a work operation has not been carried out properly (for example, "NG") as the result of verification 609 of the work log information 600 illustrated in FIG. 6.

Figure 9:
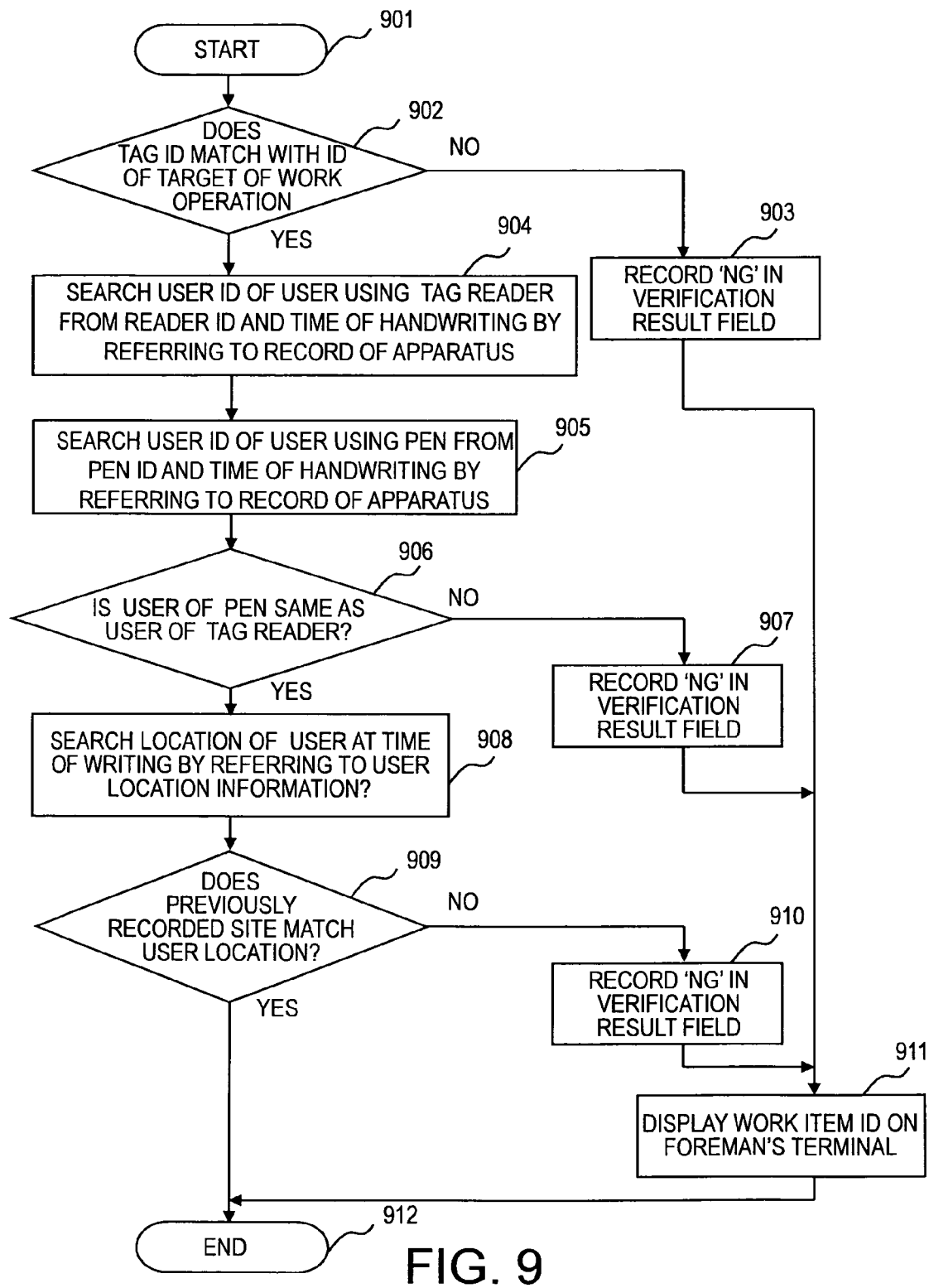
FIG. 9 is a flow chart illustrating steps of work verification processing which is executed according to the embodiment of this invention.

FIG. 9 is a flow chart illustrating steps of work verification processing which is executed according to the embodiment of this invention.

The work verification processing is executed for each item 501 (or 601) of the work log information 500 (or 600) in the following steps.

When the work verification processing is executed (901), the server 107 first judges whether or not tag IDs read by the tag reader 104 match the previously recorded IDs of targets of a work operation indicated by the item 501 (or 601) (902). Specifically, the server 107 judges whether or not values recorded as the tag IDs 505 and 506 (or 603 and 604) in an entry for the work operation match values recorded as the cable ID 502 (or 610) and the socket ID 503 (or 611) in this entry. When the former values and the latter values do not match, it means that the work operation has not been executed according to the work instruction. Then the server 107 records "NG" as the result of verification 507 (or result of verification 609) (903).

In the case where the values match in Step 902, on the other hand, the server 107 refers to the record of apparatus 113 to identify the actual user of the tag reader 104 (904). Specifically, the server 107 searches the record of apparatus 113 for an entry where the value of the reader ID 605 matches the value of the apparatus ID 701 and the value of the time of handwriting 607 is within a period between the time of lending 704 and the time of return 705. From the found entry, the server 107 retrieves the value of the user ID 706 as the ID of the user of the tag reader 104.

The server 107 also identifies the actual user of the writing tool by referring to the record of apparatus 113 (905). Specifically, the server 107 searches the record of apparatus 113 for an entry where the value of the pen ID 608 matches the value of the apparatus ID 701 and the value of the time of handwriting 607 is within a period between the time of lending 704 and the time of return 705. From the found entry, the server 107 retrieves the value of the user ID 706 as the ID of the user of the writing tool.

The server 107 next compares the retrieved user ID of the tag reader 104 and the retrieved user ID of the writing tool (906). When these user IDs do not match, it means that the worker 115 who has actually conducted the work operation is not the worker 115 who has written a result of the work operation in the work checklist 102. This raises a suspicion that the work operation has not been carried out properly, and hence the server 107 records "NG" as the result of verification 609 (907).

When the user ID of the tag reader 104 and the user ID of the writing tool match, on the other hand, the server 107 refers to the record of position of workers 114 to obtain information on the location of the worker 115 at the time of writing in the work checklist 102 (908). Specifically, the server 107 searches the record of position of workers 114 for an entry where the value of the worker ID 801 matches the writing tool user ID obtained in Step 905 and the value of the time of handwriting 607 is within a period between the time of arrival 803 and the time of leave 804. From the found entry, the server 107 retrieves the value of the site 802 as the location information of the worker 115.

The server 107 next judges whether or not the location of the worker 115 obtained in Step 908 matches the previously recorded site (909). When the former and the latter do not match, it is surmised that the worker 115 who has been supposed to conduct the work operation has not carried out the work operation. This raises a suspicion that the work operation has not been carried out properly, and hence the server 107 records "NG" as the result of verification 609 (910).

When the location of the worker 115 obtained in Step 908 and the previously recorded site match, the server 107 makes a verification that the work operation has been conducted properly, and the work verification processing is ended (Step 912).

As to the item 501 (or 601) for which "NG" is recorded in Step 903, Step 907, or Step 910, the server 107 displays information indicating a suspicion that this work item has not been executed properly on the display 110.

The work verification processing may be activated by a foreman by operating a terminal. Alternatively, the work verification processing may be activated whenever new work log information has been accumulated.

The above-mentioned embodiment describes an example in which an RFID holding a unique identifier is used as the electronic tag 103. However, the above-mentioned embodiment can be carried out also when the electronic tag 103 is a tag other than RFID as long as the employed tag holds unique identification information that can be read by the tag reader 104. Specifically, the electronic tag 103 may be replaced with, for example, a tag on which a barcode or a QR code is printed. The tag reader 104 in this case is a barcode reader or a QR code reader.

The server 107 in the above-mentioned embodiment is a computer separate from the digital-pen 101 and the tag reader 104. However, this invention can be carried out if functions equivalent to those of the server 107 are implemented by one of the components in the system. For example, the functions of the server 107 may be implemented by the digital-pen 101 (or 300) or by the tag reader 104.

According to the above-mentioned embodiment of this invention, the reliability of handwritten work log information can be improved by recording a work log written by a worker and the tag ID of a target of a work operation in association with each other. Another advantage is that mistakes in work operations and miswriting can be found with ease by verifying, through comparison, whether or not the handwriting of a work log which is determined based on work steps and information unique to a read tag have a right relation. In addition, this invention uses only information processing equipments that are small in size and that have simple functions on a work site, and hence the introduction of this invention is easy even in a construction site or other work sites that do not have a sophisticated information and telecommunication infrastructure. Further, the risk of delays in work schedule due to failures of information technology equipments cab be reduced.

This invention is applicable to a system that creates and maintains a work log with a measure to digitizing handwriting.

While the present invention has been described in detail and pictorially in the accompanying drawings, the present invention is not limited to such detail but covers various obvious modifications and equivalent arrangements, which fall within the purview of the appended claims.

What is claimed is:
1. An information processing system, comprising:
a plurality of tags;
a tag reader;
a digital-pen; and
a server,
wherein the plurality of tags each hold a unique tag identifier,
wherein the tag reader reads the unique tag identifier held in each of the plurality of tags, and outputs the read unique tag identifier,
wherein the digital-pen reads location information, which identifies a location where handwriting is made on paper, and outputs the read location information, and
wherein the server is configured to:
hold work record including information that associates the unique tag identifier recorded in the server in advance with the location on paper;
obtain information output from the tag reader and information output from the digital-pen;
judge whether or not the read unique tag identifier and a handwriting location identified by the location information are associated with each other;
identify which unique tag identifier recorded in advance is associated by the work record with the handwriting location identified by the location information, and judge whether or not the read unique tag identifier and the identified unique tag identifier match in a case where the read unique tag identifier and the handwriting location identified by the location information are judged to be associated with each other; and
output information showing a result of judging whether or not the read unique tag identifier and the identified unique tag identifier match.

2. The information processing system according to claim 1, wherein the digital-pen outputs information indicating a first time point at which the location information is read, wherein the tag reader outputs information indicating a second time point at which the tag identifier is read, and
wherein the server judges that the read unique tag identifier and the handwriting location identified by the location information are associated with each other in a case where a relation between the first time point and the second time point satisfies a predetermined condition.

3. The information processing system according to claim 1, wherein, in a case where information that associates the unique tag identifier read by the tag reader with the location information read by the digital-pen is input to the digital-pen, the digital-pen outputs the input information, and
wherein the server judges that the read unique tag identifier and the handwriting location identified by the read location information are associated with each other based on the information that associates the unique tag identifier read by the tag reader with the location information read by the digital-pen.

4. An information processing system, comprising:
a plurality of tags;
a tag reader;
a digital-pen; and
a server,
wherein the plurality of tags each hold a unique tag identifier,
wherein the tag reader reads the unique tag identifier held in each of the plurality of tags, and outputs the read unique tag identifier,
wherein the digital-pen reads location information, which identifies a location where handwriting is made on paper, and outputs the read location information and information indicating a first time point at which the location information is read, and
wherein the server is configured to:
hold work record including information that associates the unique tag identifier recorded in the server in advance with the location on paper;
obtain information output from the tag reader and from the digital-pen;
hold a record of apparatus including information for identifying a worker who has used the tag reader, information indicating a time point at which the worker used the tag reader, information for identifying a worker who has used the digital-pen, and information indicating a time point at which the worker used the digital-pen;
judge whether or not the read unique tag identifier and a handwriting location identified by the location information are associated with each other;
identify a worker who used the digital-pen at the first time point and a worker who used the tag reader at the first time point based on the record of apparatus in a case where the read unique tag identifier and the handwriting location identified by the location information are judged to be associated with each other;
judge whether or not the worker identified as a user of the digital-pen and the worker identified as a user of the tag reader match; and
output information showing a result of judging whether or not the worker identified as the user of the digital-pen and the worker identified as the user of the tag reader match.

5. The information processing system according to claim 4, wherein the tag reader outputs information indicating a second time point at which the unique tag identifier is read, and wherein the server judges that the read unique tag identifier and the handwriting location identified by the location information are associated with each other in a case where a relation between the first time point and the second time point satisfies a predetermined condition.

6. The information processing system according to claim 4, wherein, in a case where information that associates the unique tag identifier read by the tag reader with the location information read by the digital-pen is input to the digital-pen, the digital-pen outputs the input information, and wherein the server judges that the read unique tag identifier and the handwriting location identified by the read location information are associated with each other based on the information that associates the unique tag identifier read by the tag reader with the location information read by the digital-pen.

7. The information processing system according to claim 4, wherein the work record further includes information that associates the unique tag identifier and a work site with each other, and wherein the server is configured to:
hold a record of position of workers which includes information for identifying a work site where a worker has stayed and information indicating time points between which the worker stayed on the work site;
identify a work site where the worker who used the digital-pen stayed at a time point when the digital-pen read the location information based on the record of apparatus and the record of position of workers in a case where the read unique tag identifier and the handwriting location identified by the read location information are judged to be associated with each other;
judge whether or not the identified work site matches the work site associated by the work record with the read unique tag identifier; and
output information showing a result of judging whether or not the identified work site and the work site associated by the work record with the read unique tag identifier match.

8. The information processing system according to claim 7, wherein the tag reader outputs information indicating a second time point at which the unique tag identifier is read, and wherein the server judges that the read unique tag identifier and the handwriting location identified by the location information are associated with each other in a case where a relation between the first time point and the second time point satisfies a predetermined condition.

9. The information processing system according to claim 7, wherein, in a case where information that associates the unique tag identifier read by the tag reader with the location information read by the digital-pen is input to the digital-pen, the digital-pen outputs the input information, and wherein the server judges that the read unique tag identifier and the handwriting location identified by the read location information are associated with each other based on the information that associates the unique tag identifier read by the tag reader with the location information read by the digital-pen.

10. A method of controlling an information processing system comprising a plurality of tags, a tag reader, a digital-pen, and storage, the tag reader reading a unique tag identifier that is held in each of the plurality of tags, the digital-pen reading location information which identifies a location where handwriting is made on paper, the storage holding work record, the work record including information that associates the unique tag identifier recorded in the storage in advance with the location on paper, the method comprising the steps of:

judging whether or not the unique tag identifier read by the tag reader is associated with a handwriting location that is identified by the location information read by the digital-pen;

identifying which unique tag identifier recorded in advance is associated by the work record with the handwriting location identified by the location information, and judging whether or not the read unique tag identifier and the identified unique tag identifier match in a case where the read unique tag identifier and a handwriting location identified by the location information are judged to be associated with each other; and outputting information that shows a result of judging whether or not the read unique tag identifier and the identified unique tag identifier match.

11. The method according to claim 10, wherein, in the step of judging whether or not the read unique tag identifier and a handwriting location identified by the location information are associated with each other, the read unique tag identifier and the handwriting location identified by the read location information are judged to be associated with each other in a case where a relation between a first time point at which the unique tag identifier is read by the tag reader and a second time point at which the location information is read by the digital-pen satisfies a predetermined condition.

12. The method according to claim 10, further comprising the step of inputting, to the digital-pen, information that associates the unique tag identifier read by the tag reader with the location information read by the digital-pen, wherein, in the step of judging whether or not the read unique tag identifier and a handwriting location identified by the location information are associated with each other, the read unique tag identifier and the handwriting location identified by the read location information are judged to be associated with each other based on the input information.

* * * * *